United States Patent [19]
Pal et al.

[11] Patent Number: 5,193,936
[45] Date of Patent: Mar. 16, 1993

[54] FIXATION AND STABILIZATION OF LEAD IN CONTAMINATED SOIL AND SOLID WASTE

[75] Inventors: Dhiraj Pal, Chicago Heights; Karl Yost, Crete, both of Ill.

[73] Assignee: MAECORP Incorporated, Chicago, Ill.

[21] Appl. No.: 721,935

[22] Filed: Jul. 23, 1991

Related U.S. Application Data

[63] Continuation-in-part of Ser. No. 494,774, Mar. 16, 1990, abandoned.

[51] Int. Cl.$^5$ .......................... B09B 3/00; E02D 3/00
[52] U.S. Cl. .................................. 405/128; 210/751; 405/263; 588/256
[58] Field of Search .............. 405/128, 129, 263, 266; 106/900; 210/751, 912, 747; 588/256

[56] References Cited

U.S. PATENT DOCUMENTS

| | | | |
|---|---|---|---|
| 4,443,133 | 4/1984 | Barrett | 405/263 |
| 4,530,765 | 7/1985 | Sabherwal | 210/912 X |
| 4,671,882 | 6/1987 | Douglas et al. | 210/912 X |
| 4,701,219 | 10/1987 | Bonee | 106/118 |
| 4,889,640 | 12/1989 | Stanforth | 210/751 |
| 4,935,146 | 6/1990 | O'Neill et al. | 210/912 X |

*Primary Examiner*—David H. Corbin
*Attorney, Agent, or Firm*—Andrew B. Katz; Leonard D. Bowersox

[57] ABSTRACT

A two-step treatment process is disclosed for application of lead-toxic wastes to fixate and stabilize leachable lead contained therein. The process employs the use of a sulfate compound, such as gypsum, in a first step; and a phosphate reagent, such as phosphoric acid, in a second step. After thorough mixing and curing, a substantially solid end product is formed in which the lead is chemically fixed and remains in stabilized form for indefinite geologic periods. The process reduces Toxicity Characteristic Leaching Procedure lead levels below the regulatory threshold of 5 mg/l as required by the U.S. Environmental Protection Agency. The waste also beneficially undergoes volume reduction in a short curing time, and is applicable in a variety of situations.

20 Claims, 1 Drawing Sheet

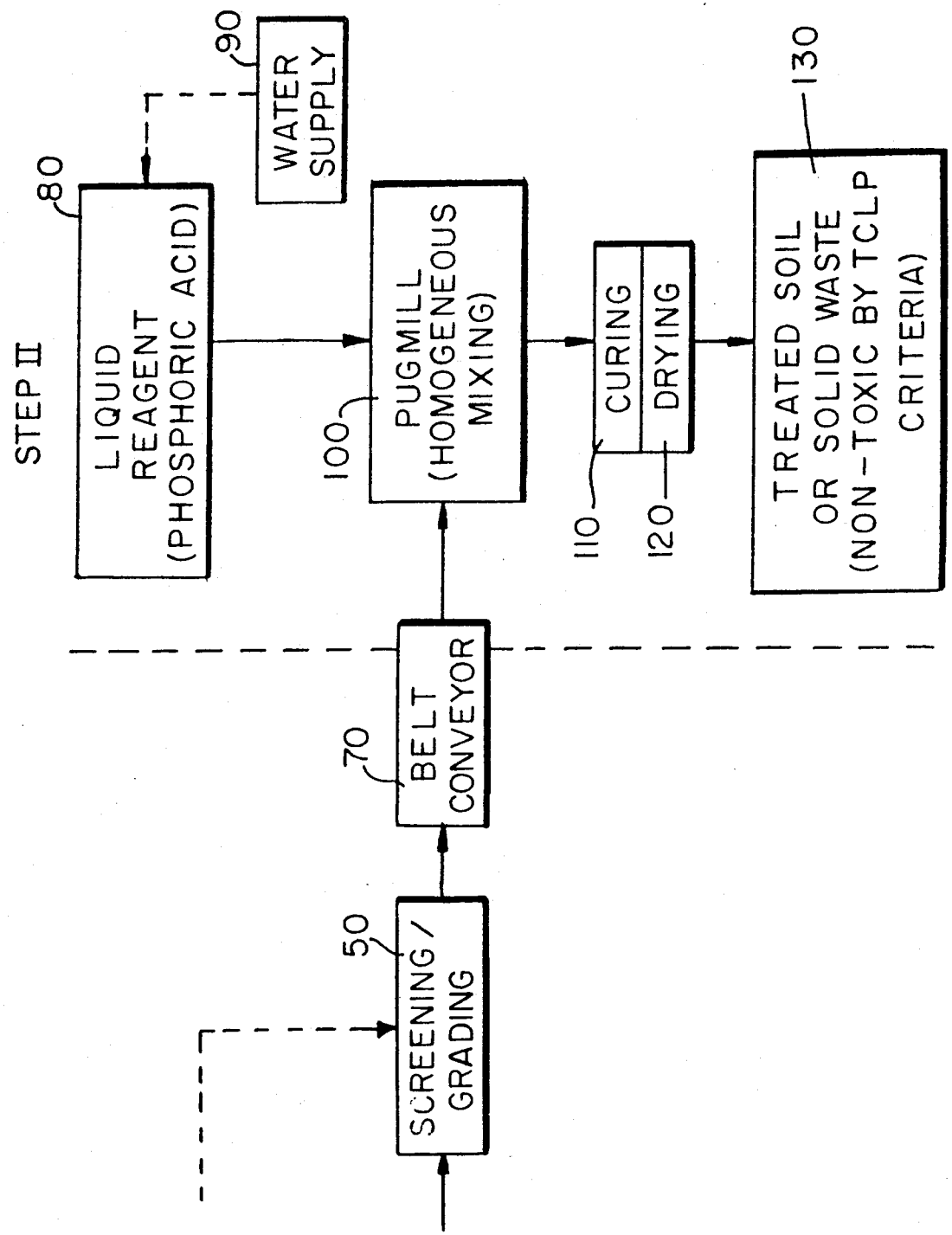

FIXATION AND STABILIZATION OF LEAD IN CONTAMINATED SOIL AND SOLID WASTE

This application is a continuation-in-part of U.S. Pat. application Ser. No. 07/494,774, filed Mar. 16, 1990, now abandoned.

FIELD OF THE INVENTION

The present invention belongs to the field of chemical treatment technology applicable to contaminated soils and solid waste materials containing unacceptable levels of leachable lead. It is applicable to the management of lead-toxic hazardous solid wastes under D008 waste code assigned by the United States Environmental Protection Agency (USEPA).

BACKGROUND OF THE INVENTION

Lead as a contaminant is often found in the soils around lead smelters, battery breaking/recycling facilities, incinerator ash facilities and foundries including metal and leaded gasoline manufacturing plants. Contamination occurs when lead-containing chemicals are used in the plants, and waste containing the lead is allowed to spill over or drain into the soil. Many abandoned hazardous waste sites are heavily contaminated with lead, threatening human health, the food chain, the ecosystem and the environment. Federal legislation, such as the National Contingency Plan (NCP), the Superfund Act (CERCLA) and the Superfund Amendments Reauthorization Act (SARA) specify the remediation of sites containing lead-toxic soils and solid wastes.

The Resource Conservation and Recovery Act of 1976, commonly known as the RCRA, provided for federal classification of hazardous waste. The statutory language defines "hazardous waste" as solid waste or combinations of solid waste which pose a "substantial present or potential hazard...when improperly treated, stored, transported, or disposed of, or otherwise mismanaged." Any solid waste that exhibits one of the hazard characteristics defined in subpart C of Part 261, Volume 40, Code of Federal Regulations is, by definition, a hazardous waste.

A solid waste is considered to be a hazardous waste if it is listed, or it exhibits characteristics of either ignitability, corrosivity, reactivity, or toxicity as determined by the Toxicity Characteristic Leaching Procedure (TCLP) (USEPA Method 1311). Historically, toxicity characteristic regulations had been based on the Extraction Procedure (EP) Toxicity Test (USEPA Method 1310), which specified laboratory steps to be followed in analyzing samples. The test was aimed at identifying the tendency of wastes to generate a leachate with concentrations of contaminants greater than the values listed in Appendix II of the Code of Federal Regulations, Part 261.24, page 406, revised July 1, 1988. If concentrations of leachable, mobile lead were found to be greater than 5 milligrams per liter, the material was considered characteristically toxic for lead and hence hazardous with respect to lead content. Such characteristically toxic wastes required treatment to comply with the USEPA regulations defining the treatment standards for lead and other parameters of concern. This EP Toxicity Test is now obsolete, and has been replaced by the TCLP for 39 different parameters including lead.

Effective Nov. 8, 1990, USEPA established the treatment standard for lead wastes (D008), and particularly for lead contaminated soils and solid wastes, at a toxicity characteristic level of 5 milligrams per liter in the extraction fluid according to the TCLP Test. The TCLP Test is much more rigorous—and is more uniformly applicable to a larger number of parameters—than the EP Toxicity Test. It replaced the EP toxicity method for RCRA waste determination. The TCLP Test requires sizing of waste material to less than $\frac{3}{8}$ inches or 9.5 mm and agitation of a 100g waste sample in 2 liters of specified extraction fluid for 18 hours on a rotating agitator at a speed of about 30 revolutions per minute. The lead concentration is determined in the extraction fluid after filtration under pressure, and expressed in units of milligrams per liter (mg/l).

Any solid waste that contains leachable TCLP lead levels in excess of 5 milligrams per liter is considered characteristically toxic and hence hazardous. Such hazardous waste must be treated with at least one of the Best Demonstrated Available Technologies (BDAT) and/or with an alternative technology to decharacterize the waste for lead toxicity. In other words, treatment of the lead-bearing waste with a BDAT for decreasing TCLP lead to a level below 5 mg/l is required before land disposal is permitted. Land disposal methods include waste staging on a land surface, placing waste into a landfill, using surface impoundment techniques, waste piling, disposing of waste in injection wells or land treatment facilities (land farming), or impounding the waste in salt domes, salt bed formations, underground mines or caves, and bunkering the waste in concrete vaults. Land disposal restrictions ban treated wastes with TCLP lead levels greater than 5 mg/l in the leachate. Such characteristic lead toxic wastes must be treated with a cost effective and practical technology that is commercially available and that provides substantial treatment, and that beneficially results in a decrease in risk to human health and the environment.

Prior to the present invention for treatment of contaminated soils and D008 solid wastes, there existed no technology that could be applied (i) cost effectively on a commercial scale to treat lead-toxic soils and solid wastes, (ii) to decrease the waste volume and at the same time work under substantially dry conditions with no generation of wastewater or other byproducts, (iii) to comply with the latest and final land ban regulations (55 Fed. Reg. 22693-94 (1990)), (iv) to cure the wastes in few hours for rapid sampling and final internment evaluation and (v) to a wide variety of lead-toxic solid wastes, soils and sludges with a tremendous flexibility of scale and mobility.

Various conventional methods have been tried to remove leachable, mobile lead from soils and solid waste materials. Those methods include washing, leaching and extracting the lead. According to conventional practice, contaminated soil or solid waste material is excavated from the ground for processing and/or washing. During washing, the contaminated material is immersed or supersaturated in water or other specified solutions while it is being agitated. Removal of lead from contaminated soils and solid wastes by leaching, extraction and/or washing procedures is extremely expensive and cost-prohibitive because this method generates vast quantities of lead-toxic wastewater which requires further treatment and disposal.

As understood by the inventors, none of the earlier processes reduced the TCLP lead content to below 5 mg/l of lead in the extract from lead contaminated soil or solid waste material.

Wet methods for removing lead from contaminated soil or solid waste involve the use of water in the formation of slurries, which require cumbersome equipment for the separation of lead from the waste material. The separated solids are usually wet, so that the end product fails the Paint Filter Test (USEPA Method 9095 under SW-846). Further processing of these wet materials is therefore required before disposal as a stabilized material. The additional steps required in the treatment by conventional wet processing of contaminated soil and solid waste are prohibitively expensive.

Other conventional techniques involve the chemical fixation of lead in contaminated soils and solid waste. One well-known technique according to the International Technical Information Institute involves the extraction of lead using nitric acid and/or aqua regia, and a subsequent purging of the resultant lead nitrate solution with hydrogen sulfide gas to precipitate the lead nitrate as lead sulfide. The use of noxious hydrogen sulfide gas, however, necessitates specific health and safety measures that increase environmental remediation costs.

Falk et al. U.S. Pat. No. 4,687,373, describes a composition which encapsulates contaminants such as lead in soils, sludges, sediment and ash. A cementitious matrix in the form of metal metasilicates is formed to encapsulate the contaminants. The metal metasilicates, however, detrimentally increase the volume and weight of the treated soil or solid waste material.

Hemwall U S. Pat. No. 3,201,268, describes a method for stabilizing clay soils by mixing phosphoric acid, or a combination of phosphoric and sulfuric acids, with the soil. This mixture is further combined with a water-soluble lead salt. The resulting composition may be compacted and cured to produce a stabilized mass strength as compared with untreated soil. This method is suitable for the stabilization of argillaceous soils and clays containing aggregates.

Webster et al. U.S. Pat. No. 4,028,130, describes a method for disposing of municipal sewage plant waste materials, particularly digestive sewage sludge. The sludge is treated with cementitious reactants, including calcium sulfate, to form a hardened product for subsequent disposal. The sewage sludge contains heavy metals, such as lead, which may be involved in the cementitious reaction.

Gouvenot U.S. Pat. No. 4,615,643, describes a method of sealing a mass of stored waste containing heavy metal cations in soil. A grout is added to the soil which comprises cement, clay, silicate, sodium carbonate and an alkali-metal pyrophosphate or tartrate. The lead cation forms a water-insoluble compound upon reaction with the sodium carbonate and pyrophosphate. The process requires a long curing time and has limited commercial application.

Stanforth U.S. Pat. No. 4,889,640, discloses a method of fixation using reactive calcium carbonate, reactive magnesium carbonate, and reactive calcium magnesium carbonate for reaction with lead and cadmium in hazardous solid wastes (pH 6 to 9) from foundries and metal operations. Stanforth's technique reduces EP Toxicity Test lead and cadmium in hazardous wastes when treated with a water-softening lime sludge (a source for reactive carbonates of calcium and magnesium). Stanforth cited the work of Inglis (U.S. Pat. No. 4,652,381) in which crystalline and non-reactive forms of calcium carbonate (such as limestone) were mixed with a highly acidic wastewater (pH 2) to precipitate lead, copper and zinc out with formation of a sludge that might contain significant amounts of leachable metals. This solid waste sludge requires further treatment in order to render it non-hazardous prior to its disposal. As recognized in Stanforth, however, limestone (calcium carbonate) is relatively inefficient at removing heavy metals such as lead and cadmium from hazardous solid or sludge waste because of the slow release of carbonates to react with heavy metals. Furthermore, it is common knowledge that carbonates decompose under acid conditions and liberate carbon dioxide as well as metals that may endanger the environment in the presence of acid rain or landfill leachate.

Bonee U.S. Pat. No. 4,701,219, discloses the treatment of spent sorbent wastes (containing leachable vanadium, nickel, and sodium) with alkaline earth metal compounds, including calcium sulfate. According to that patent, powdered lime (calcium hydroxide or calcium oxide) and calcium fluoride were most effective in decreasing the leachable vanadium and nickel.

Douglas et al. U.S. Pat. No. 4,671,882, discloses the generation of non-hazardous sludge from wastewater containing a mixture of metals by first adding phosphoric acid to lower the pH of the wastewater less than 5.0. Thereafter, the acidified wastewater was treated with a coagulant, ferric chloride, and the pH was raised to a range of 7 to 8.5 with calcium hydroxide. An anionic polymer (DREW FLOC 270) was employed as a flocculent to aid dewatering of the sludge. The resulting sludge contained heavy metals in non-leachable form by EP Toxicity Test criteria. The method developed by Douglas et al. for industrial wastewater treatment creates sludge that is characteristically non-hazardous by EP toxicity criteria for zinc, lead, chromium, nickel, copper and cadmium, but which may not pass the Paint Filter Test and the TCLP criteria. There is no disclosure of TCLP testing conducted on this sludge or wastewater. The method disclosed by Douglas et al. does, however, generate a supernatant wastewater stream containing 1 ppm lead as compared to a standard limit of 0.05 ppm lead for drinking water under the Safe Drinking Water Act (SDWA), therefore requiring further treatment of the supernatant during dewatering operations for removal of residual metals. The method disclosed in Douglas et al. does not appear to be transferable to lead contaminated soils or solid wastes at any scale.

The conventional processes as described above typically do not reduce levels of leachable lead below the maximum concentration of contaminant allowed under current land ban regulations as per the TCLP Test. Moreover, some of the conventional methods involve wet processing, which is burdensome, cost prohibitive, and requires a considerable amount of equipment to separate the lead from the contaminated soil or solid waste material in addition to treatment steps.

An innovative and cost-efficient technology is therefore needed that does not generate wastewater or supernatant and that quickly treats the lead-toxic soils and D008 solid wastes under relatively dry conditions while fixing the leachable lead to levels below 5 mg/l by TCLP Test criteria as required under EPA regulations.

Solidification methods based on cementation technology require at least 28 days of curing time, increase the waste volume, and may raise the pH to a range from 12.5 to 13.5. Hardened concrete material is not conducive to retreatment in the event treatment fails TCLP confirmatory testing. Solidification methods utilizing lime kiln dust, calcium carbonate and/or powdered lime for lead fixation are temporary solutions for lead treatment. Furthermore, those methods increase the waste volume and mass, and therefore, dilute the lead in the final waste matrix.

The use of phosphoric acid alone for fixing lead in solid waste and soils fails to pass the TCLP lead criteria in many cases for lead contaminated soils. Addition of gypsum powder to phosphoric acid treated soils, however, further lowers the TCLP lead levels below the regulatory threshold as illustrated in the examples herein. Stabilization of lead in D008 soils and solid waste is crucial, and a BDAT is therefore urgently needed that is (a) relatively simple and feasible for treating hazardous solid wastes; (b) commercially practicable, (c) economically applicable and transferable to different lead contaminated sites, (d) rapid, and (e) free of side streams or byproduct wastes. The technology disclosed herein generates an end product that is easily handled and that passes the Paint Filter Test used for solid waste.

SUMMARY OF THE INVENTION

The present invention relates to a chemical treatment technology for immobilizing leachable lead in contaminated soils and solid waste materials. According to the present invention, a process for treating lead-toxic solid wastes in order to stabilize the leachable lead is disclosed, comprising the steps of: (i) mixing the solid waste with a sulfate compound, such as calcium sulfate dihydrate (gypsum powder) or sulfuric acid, having at least one sulfate ion for contacting waste particles and reacting with said leachable lead to produce a substantially insoluble lead composition, such as anglesite and/or calcium-substituted anglesite; and, (ii) mixing said solid waste and sulfate compound with a phosphate reagent, such as phosphoric acid, having at least one phosphate ion for reacting with said leachable lead to produce a substantially insoluble lead composition. The treated material from this process is substantially solid in form and passes the Paint Filter Test while satisfying the regulatory standard for TCLP lead. In all instances, application of this process has been found very reliable in meeting the treatment objectives and in consistently decreasing waste volume.

It is an object of the present invention to provide a technology for treatment of lead-containing solid waste and soil that produces an acceptably low level of leachable lead in the final product to comply with the statutory requirements of TCLP and to pass the Paint Filter Test.

Another object of the invention is to provide such a process while producing no wastewater or secondary waste streams during said process.

Still another object of the invention is to provide such a process which also causes the solid waste material to undergo a volume reduction as a result of treatment.

Yet another object of the invention is to cause fixation of the leachable lead in the solid waste that is permanent under both ordinary and extreme environmental conditions.

These and other objects of the invention will be apparent from the detailed description of the invention set forth below.

BRIEF DESCRIPTION OF THE DRAWINGS

FIG. 1 is a block diagram of one embodiment of the treatment technology of the present invention.

DETAILED DESCRIPTION OF A PREFERRED EMBODIMENT

The treatment technology according to the present invention consists of a two-step process for treating contaminated soils and/or solid waste materials with chemical treating agents that convert leachable lead to synthetic (man-made) substantially insoluble lead mineral crystals. As used here, "substantially insoluble" means the leachable lead content in the treated waste sample is less than 5.0 mg/l in the extract by the TCLP Test.

The first step of this novel process comprises the reaction of leachable lead in contaminated soils or solid waste materials with a gypsum powder, calcium sulfate dihydrate ($CaSO_4 \cdot 2H_2O$). Calcium sulfate dihydrate powder reacts with leachable and mobile lead species in wastes to form hard sulfates, which are relatively insoluble in water. In this invention, the powder form of dry calcium sulfate dihydrate, or gypsum, is preferred for blending with lead contaminated materials because it provides a uniform cover or dry coating over the surfaces of the waste particles and aggregates under low moisture conditions. The greatest benefit and fastest reaction is achieved under condition wherein 95% of the powder is passable through a 100 mesh sieve, and the remaining 5% is passable through a 20 mesh sieve.

The amount of gypsum powder employed is typically from 0–30 percent of the weight of solid waste material being treated. The actual amount employed will vary with the degree and type of lead contamination in the waste material or soil, and with the initial composition as well as the condition of the waste material, among other factors.

Alternatively, sulfuric acid, or alum in liquid or powder form can also be used as sources of sulfate ion in certain solid wastes that contain sufficient calcium prior to treatment.

In the first step of the instant process, a thorough and uniform mixing of gypsum powder with the solid waste is accomplished by mixing shredded and screen waste particles with small gypsum particles in, for example, a grizzly or other mixing device. The calcium ions from the gypsum powder displace lead from soil complexes and organic micelles present in the contaminated soil and solid waste material. The following equations (1) and (2) describe the reaction of leachable lead with gypsum.

Pb-Micelle + $CaSO_4 \cdot 2H_2O \longrightarrow$ (1)

$PbSO_4$ + Ca-Micelle + $2H_2O$
Anglesite

$Pb(HCO_3)_2 + CaSO_4 \cdot 2H_2O \longrightarrow$ (2)

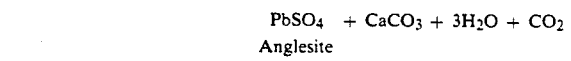

$PbSO_4$ + $CaCO_3$ + $3H_2O$ + $CO_2$
Anglesite

The reaction of lead with gypsum forms a "hard sulfate" which crystallizes into mineral species of the barite family—anglesites and calcium-substituted anglesites—which are insoluble in water. The solubility product of lead sulfate is $1.8 \times 10^{-8}$, indicating that anglesite crystals would continue to develop over the geologic periods.

In the second step of the process, the solid waste material as amended with gypsum powder is treated with a phosphate-supplying reagent, such as (for example), phosphoric acid. Upon contact with the soil or solid waste, the phosphate-supplying reagent reacts chemically to immobilize the remaining leachable lead. The phosphate-supplying reagent includes phosphate ion sources having one or more reactive phosphate ions, such as phosphoric acid, trisodium phosphate, a potassium phosphate and monobasic or dibasic calcium phosphates.

The quantity of phosphate-supplying reagent employed will vary with the characteristics of the solid waste being treated, including particularly such factors as leachable lead content, total lead, and buffering capacity, among other factors. It has been determined that in most instances a quantity of phosphoric acid up to 30 percent of the weight of the waste material is sufficient. The concentration of phosphoric acid in solution will typically range from about 2–75 percent by weight. The solution and treatment process are maintained above 30° F. to permit the handling of the phosphoric acid as a liquid reagent. Below 30° F., the phosphoric acid tends to gel while water freezes to form ice, thus creating material handling problems.

Free lead, along with calcium ions found in the solid waste (including those imparted through the first step of the process), reacts with the phosphate to form insoluble superhard rock phosphates or calcium substituted hydroxy lead apatites as shown in equation (3a and b):

$$4PbCO_3 + CaCO_3 + 3H_3PO_4 \longrightarrow \tag{3a}$$

$$Pb_4Ca(OH)(PO_4)_3 + 5CO_2 + 4H_2O$$
Hydroxy Lead
Apatites $$4PbCO_3 + CaSO_4.2H_2O + 3H_3PO_4 \longrightarrow \tag{3b}$$

$$Pb_4Ca(OH)(PO_4)_3 + H_2SO_4 + 4CO_2 + 5H_2O$$
Hydroxy Lead
Apatites

The phosphate ions are added to the contaminated soils in solution form; for example, phosphoric acid may be added to water in amounts ranging from about 2 percent to about 75 percent by weight. Phosphoric acid decomposes carbonates and bicarbonates in wastes leading to the synthesis of apatites and evolution of carbon dioxide gas. Destruction of carbonates and bicarbonates contributes to desirable volume reductions.

Although water molecules are generated during the carbonate and bicarbonate decomposition process, it is preferred to have soil moisture at about 10 per cent to about 40 per cent by weight of the soil in order to accelerate the fixation of the leachable lead with the phosphate ions. At this moisture range, material handling is also easy and efficient. It is apparent from Equations (2), (3a) and (3b) that gypsum and phosphoric acid decompose carbonates and bicarbonates during synthesis of new stable minerals of the barite, apatite, and pyromorphite families in soils (as shown in Table I). Decomposition of carbonates and bicarbonates is usually associated with the evolution of carbon dioxide, formation of hydroxyl group, (OH$^-$), and release of water molecules. As the water evaporates and carbon dioxide molecules are lost to the atmosphere, the treated waste mass and volume are decreased significantly.

The solid sulfate powder and the phosphate-supplying reagent are added to contaminated soil and solid waste material having a typical moisture content ranging from about 10 percent to about 40 percent by weight. At a moisture level within the foregoing range, the curing time of the treated materials is approximately 4 hours, which provides adequate time for chemical reactions to occur and immobilize the leachable lead species. Crystals of various lead mineral species begin to form immediately, but will continue over long time periods with an excess of treatment chemicals present. This contributes to "self-healing," as noted during treatability studies as well as full scale treatment operations.

Under the foregoing conditions, the immobilization of leachable lead occurs in a relatively dry environment because no wet byproducts, slurries or wastewater are produced by the process of the present invention. Operation of the process under relatively dry conditions beneficially allows cost-efficient handling of the contaminated soils and the waste materials. This allows compliance with Paint Filter Test for solid wastes required by USEPA and RCRA approved solid waste landfill facilities. Effective mechanical mixing, as by a pug mill or other such mixing device, eliminates the need for diffusion in the nonaqueous solid waste matrix.

The water resistant and insoluble lead minerals synthesized in soils and solid wastes according to this process are stable, and would behave like naturally occurring rock phosphates and hard sulfates. A list of synthetic lead mineral species and complexes is presented in Table I below, in order of the relative abundance found during characterization of treated soil by x-ray florescence spectrometry, polarized light microscopy (PLM) and scanning electron microscopy (SEM).

TABLE I

| Synthetic Mineral Species of Lead Detected in a Treated Sample (Listed in Decreasing Order of Abundance) | |
|---|---|
| 31–41% | Calcium Substituted Hydroxy Lead Apatites, $Ca_{0.5-1.5}Pb_{3.5-4.5}(OH)(PO_4)_3$ |
| 28–29% | Mixed Calcium Lead Phosphate Sulfates, $Ca_{0.05-0.2}Pb_{0.8-0.95}(PO_4)_{0.15-0.5}(SO_4)_{0.25-0.75}$ |
| 21–22% | Mixed Calcium Anglesites. $Ca_{0.05-0.3}Pb_{0.7-0.95}SO_4$ |
| 3–6% | Anglesites, $PbSO_4$ |
| 2–7% | Lead Hydroxy/Chlor Apatite, $Pb_5(PO_4)_3(OH)_{0.5}Cl_{0.5}$ |
| 1–3% | Pyromorphite, $Pb_3(PO_4)_2$ |
| 1–2% | Organo-Lead Phosphate Sulfate, Humus-o-$Pb_3(PO_4)(SO_4)$ |

Some of the chemical reactions that occur during the curing stage, and lead to the development of mixed minerals containing both sulfates and phosphates, are illustrated in equations (4) and (5).

$$18PbCO_3 + 5CaSO_4.2H_2O + \tag{4}$$

$$12H_3PO_4 \xrightarrow[\text{Temperature (>30° F.) \& Pressue}]{\text{Cure Time = 4 hrs under Ambient}}$$

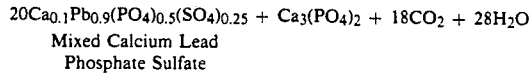

$$20Ca_{0.1}Pb_{0.9}(PO_4)_{0.5}(SO_4)_{0.25} + Ca_3(PO_4)_2 + 18CO_2 + 28H_2O$$
Mixed Calcium Lead
Phosphate Sulfate $$6Pb[Humus] + 2CaSO_4.2H_2O + \tag{5}$$

-continued $$3H_3PO_4 \xrightarrow[\text{Temperature (> 30° F.) \& Pressure}]{\text{Cure Time = 4 hrs under Ambient}}$$

$$Ca(9H)[Humus]\text{-}Pb_3(PO_4)SO_4 +$$
Organo-Lead Phosphate
Sulfate $$2H_2O + Ca_{0.3}Pb_{0.7}SO_4 + Ca_{0.7}Pb_{2.3}(PO_4)_2$$
Anglesite      Pyromorphite
(Ca substituted)

The process of the present invention beneficially decreases the volume of the waste materials through: (i) the evolution of carbon dioxide during the chemical decomposition of carbonates and bicarbonates, upon reaction with the acidic components in gypsum and phosphoric acid, and (ii) hardening and chemical compaction as a result of the synthesis of new minerals which result in changes in interstitial spaces and interlattice structures. Applications of the process on a lead contaminated soil was associated with pore space decrease from 38.8% to 34.3% by volume. A decrease in pore space was associated with increased compaction of the treated soils and a decrease in overall waste volume ranging from 21.4% to 23.0%. For different waste types, the volume decrease varies with the amount of treatment chemicals used in the process. In another lead toxic solid waste, application of this process resulted in a volume decrease of the order of 36.4% while decreasing the leachable lead to levels below the regulatory threshold.

This reduction in volume of the contaminated soil and the solid waste material makes the process of the present invention particularly beneficial for off-site disposal in a secured landfill by cutting down the costs of transportation and storage space. The process can be accomplished at a cost-efficient engineering scale on-site or off-site for ex-situ treatment of lead-toxic solid wastes. This innovative treatment technology also offers a great potential for in-situ application to immobilize lead most economically without generation of any wastewater or byproducts.

FIG. 1 illustrates schematically the process of the present invention. The lead-contaminated uncontrolled hazardous waste site 10 with lead-toxic wastes is subject to excavation and segregation 20 of waste piles based on their total lead and TCLP lead contents into (a) heavily contaminated pile 30A, (b) moderately contaminated waste pile 30B and (c) least contaminated waste pile 30C. The staged soil and solid waste material in piles 30A, 30B and 30C is subjected to grinding, shredding, mixing 40 and screening 50 through an appropriately sized mesh sieve. The screening yields particles that are usually less than 5 inches in diameter for mixing with gypsum powder 60 in a grizzly that allows a uniform coating of gypsum over the soil particles and waste aggregates during the grinding, shredding and/or mixing step. Alternatively, as shown by the dashed line, gypsum powder 10 may be added continuously to the screened solid waste material in prescribed amounts as determined during treatability trials. Most of the leachable lead binds chemically with gypsum at molecular level to form lead sulfate, which crystallizes into a synthetic nucleus of mixed calcium anglesite and pure anglesite minerals identified in the treated material by chemical microscopy techniques.

The gypsum-coated waste particles and aggregates are then transported on a belt conveyor 70 or other conveying means to an area where an effective amount of phosphoric acid solution 80 of specified strengths in water 90 is added or sprayed just prior to thorough mixing in a pug mill 100 (or other mixing means). The temperature of the phosphoric solution is preferably maintained above 30° F. to prevent it from gelling. The treated soil and wastes are subject to curing 110 and drying 120 on a curing/drying pad, or may less preferably be cured and dried using thermal or mechanical techniques. The end product of the process passes the Paint Filter Test. During the curing time of about four hours, various "super-hard phosphate" mineral species, such as calcium-substituted hydroxy lead-apatites and mixed calcium-lead phosphate-sulfate mineral species, are formed in treated waste media 130. Crystals of these mineral species (in early stages of development) have been identified in the treated soil materials and solid wastes by geo-chemical and microscopy techniques like PLM and SEM.

The proportions of waste materials and reagents used in the process may be varied within relatively wide limits. For example, the amount of gypsum powder should be sufficient to produce lead sulfate in contaminated soil or solid waste material. In addition, the amount of phosphate-supplying reagent is prescribed in an amount sufficient to produce mineral species such as hydroxy-lead apatite in contaminated soil or solid waste material during relatively short curing time of 4 hours, usually ranging from about 3 to about 5 hours. Further drying of the treated material may take 24 to 96 hours, but has not been required in any application to date. Table II documents the optimum curing time of 4 hours for the process. In all instances, the leachable lead as measured by the EP Toxicity Test Procedure was found below 0.6 mg/l and the differences between analytical values below this level are statistically insignificant.

TABLE II

Documentation of Optimum Curing Time
Using EP Toxicity Test criteria for lead fixation

| Waste Matrix Category | EP Toxic Pb (Untreated Sample) mg/l | EP Toxic Pb concentration in mg/l found in processed sample at a Curing Time of | | |
|---|---|---|---|---|
| | | 4 Hrs. mg/l | 48 Hrs. mg/l | 96 Hrs. mg/l |
| Pb Toxic Soil A | 495 | 0.4 | 0.4 | 0.6 |
| Pb Toxic Soil B | 46 | 0.3 | 0.2 | 0.2 |
| Pb Toxic Soil C | 520 | 0.3 | 0.5 | 0.5 |

The amount of the gypsum powder and the phosphoric acid employed will be dependent on the amount of contaminant present in the soil, initial characteristics of the solid waste material, whether the material is in-situ or is excavated and brought to an off-site facility for treatment; the same is true for other sulfate compounds and phosphate reagents. The following Example I describes various ratios of the chemical reagents for application to the excavated lead-contaminated solid wastes in order to render the leachable lead substantially insoluble; i.e., to reduce the leachable lead to levels below 5.0 mg/l by EP Toxicity Test lead and TCLP Test criteria no in force under current land-ban regulations.

EXAMPLE I

Nearly twenty (20) different chemicals and products from various vendors and supply houses were screened for chemical fixation of leachable lead in hazardous solid waste samples. Only six (6) of these treatment chemicals were found effective in decreasing the leachable lead as measured by: (1) the EP Toxicity Test and (2) the TCLP Test. Table III presents a summary of leachable lead found in untreated and treated waste samples allowed to cure for a minimum of 4 hours after treatment with at lease one of the effective chemicals. Treatment chemicals found relatively ineffective for lead fixation included a variety of proprietary products from American Colloid Company and Oil Dri, different sesquioxides like alumina and silica, calcium silicate, sodium silicate, Portland cement, lime, and alum from different vendors. Results for these ineffective chemicals are not shown in Table III.

TABLE III

Relative effectiveness of various treatment chemicals screened to decharacterize the lead-toxic solid wastes

| | Treatment Chemical (Step) | Leachable Lead in mg/l | |
|---|---|---|---|
| | | EP Toxicity Test | TCLP Test |
| I. | Untreated Control | 221.4 | 704.5 |
| II. | Single Treatment Chemical (One Step Treatment) | | |
| | a. Sulfuric Acid (I) | 11.7 | 39.8 |
| | b. Phosphoric Acid (I) | 1.0 | 5.9 |
| | c. Superphosphate Granular (I) | 2.7 | 11.4 |
| | d. Liquid Phosphate Fertilizer (I) | 19.4 | 64.3 |
| | e. Gypsum Powder (I) | 24.9 | 81.8 |
| | f. Sodium Phosphate (I) | 28.7 | 93.9 |
| III. | Two Step Treatment | | |
| | g. Sulfuric (I) & Lime (II) | 20.6 | 68.1 |
| | h. Gypsum Powder (I) & Alum (II) | 3.9 | 15.3 |
| | i. Sodium Phosphate (I) & Phosphoric (II) | 3.1 | 12.6 |
| | j. Gypsum (I) & Phosphoric (II) | N.D.* | 1.6 |
| IV. | Three Step Treatment | | |
| | k. Gypsum (I), Alum (II) & Sodium Phosphate (III) | 12.8 | 43.3 |
| | l. Gypsum (I), Phosphoric (II) & Sodium Phosphate (III) | N.D.* | 1.4 |

*N.D. means non-detectable at <0.5 mg/l.

Evaluation of a single treatment chemical in one step reveals that phosphoric acid was most effective in fixation of leachable lead followed by granular super-phosphate, a fertilizer grade product available in nurseries and farm supply houses. However, neither treatment effectively treated leachable lead to the USEPA treatment standard of 5.0 mg/l by TCLP methodology.

Although both phosphoric acid and granular superphosphate were effective in meeting the now obsolete EP Toxicity Test criteria at 5.0 mg/l, this test has been replaced by TCLP Test criteria for lead of 5.0 mg/l. Single application of the phosphoric acid, granular superphosphate or any other chemical was short of meeting the regulatory threshold of 5.0 mg/l by TCLP Test criteria for lead.

In a two-step treatment process, application of gypsum during Step I and treatment with phosphoric acid in Step II resulted in decrease of TCLP-lead consistently and repeatedly below the regulatory threshold of 5.0 mg/l. The results of this two-step treatment process utilizing gypsum in Step I and phosphoric acid in Step II are most reliable and hence, the two-step process may be applied to a wide variety of lead contaminated wastes as exhibited in Example II.

A three-step process, as set forth in Table I, was not perceived to be as economically viable as a two-step treatment process, despite its ability to reduce lead levels in satisfaction of the TCLP Test criteria. A process that employs the beneficial combination of treatment first with a sulfate compound and then with a phosphate reagent in accord with the present invention, in combination with one or more additional treatment steps, may nevertheless be within the scope of the invention.

In order to illustrate the relative proportions of two chemicals, e.g., gypsum and phosphoric acid, needed for treatment of lead-toxic wastes, three soil samples from a lead contaminated test site were processed using the present invention, in which gypsum powder was used in the first step, and phosphoric acid solution in water at concentrations of about 7, 15 and 22 percent by weight in the second step. The soil was measured for lead content in accordance with the EP Toxicity Test before and after treatment. A level of leachable lead below 5 mg/l was considered non-hazardous according to this procedure. During these test runs, the EP Toxicity Test criteria were in force for treated waste material The results of these tests are set forth in Table IV:

TABLE IV

Effectiveness in Fixation and Stabilization of Leachable Lead in lead toxic soils

| | Process Steps | | EP TOX LEAD TEST RESULTS | |
|---|---|---|---|---|
| Soil Sample (Lead-toxic waste) | Gypsum Step I (g/kg soil) | Phosphoric Step II (g/kg soil) | Before Treatment | After Treatment |
| | | | milligrams per liter | |
| 1. Low lead contamination | 20 | 10 | 8 | <0.1 |
| 2. Moderate contamination | 30 | 20 | 61 | <0.1 |
| 3. High lead contamination | 40 | 30 | 3,659 | 1.7 |

The foregoing results demonstrate that the process of the present invention was effective in all three samples, representing 3 different levels of lead contamination. The process is flexible and is usually optimized during bench scale treatability studies for each waste type to immobilize the leachable lead and to decharacterize or transform the lead-toxic waste into non-toxic solid waste acceptable to TSD facilities under current land ban regulations. A net reduction of 36.4% in waste volume through use of the instant process has been observed. Typical volume reductions are set forth in Table V.

TABLE V

Change in Solid Waste Volume as a Result of Treatment with the Two-Step Process

| | SOLID WASTE VOLUME | | |
|---|---|---|---|
| SOLID WASTE MATERIAL (Treatment Scale) | Initial (Before Application of Process) | Final (After Application of Process and Curing) | Decrease in Waste Volume (%) |
| 1. Lead toxic soil (full scale) | 3850 cu. yd. | 2450 cu. yd. | 36.4 |
| 2. Lead-toxic Solid Waste (Bench Scale) | | | |
| Test Run I | 106.1 cu. in. | 81.51 cu. in. | 23.0 |

TABLE V-continued
Change in Solid Waste Volume as a Result of Treatment with the Two-Step Process

| SOLID WASTE MATERIAL (Treatment Scale) | SOLID WASTE VOLUME | | |
|---|---|---|---|
| | Initial (Before Application of Process) | Final (After Application of Process and Curing) | Decrease in Waste Volume (%) |
| Test Run II | 22.0 cu. in. | 17.3 cu. in. | 21.4 |

The most profound effect of the process of the present invention is at a structural level, where the breakdown of granular aggregates is associated with a loss of fluffiness and a decrease in pore space and increased compaction due to physical, mechanical and chemical forces at different levels. At a molecular level, phosphoric acid breaks down the minerals containing carbonates and bicarbonates, including cerussites, in stoichiometric proportions. Soon after the addition of phosphoric acid to a solid waste containing cerussites, extensive effervescence and frothing becomes evident for several minutes and sometimes for a few hours. The phosphoric acid breaks down the acid sensitive carbonates and bicarbonates leading to the formation of carbon dioxide, water and highly stable and insoluble sulfate and phosphate mineral compounds. Thus, structural changes due to interlattice reorganization as well as interstitial rearrangement in waste during processing are associated with an overall decrease in waste volume. Depending on the extent of carbon dioxide loss from the breakdown of carbonates and bicarbonates present in the lead-toxic solid waste, the process may lead to a slight loss of waste mass as well. Water generated during the chemical reactions is lost by evaporation, which further decreases the mass and volume of the treated solid wastes and soils.

The cost of the process of the present invention is moderate to low, depending upon (i) waste characteristics, (ii) treatment system sizing, (iii) site access, (iv) internment of final disposition of treated material and (v) site support requirements. The costs of treatment and disposal are presently on the order of $115 per ton of lead-toxic waste, as compared to off-site conventional treatment and disposal costs of over $250 per ton if no treatment in accord with the invention had been performed. Moreover, recent land ban regulations would prohibit the disposal of all lead-toxic wastes in landfills. The foregoing Example makes clear that the process of the present invention provides an efficient technology that is economically attractive and commercially viable in meeting regulatory criteria for landfills.

EXAMPLE II

The process of the present invention was applied on bench scale to five different lead-toxic waste materials that were characterized for total lead, TCLP-lead, moisture content and pH before and after treatment. A curing time of 5 hours was allowed for completion of the treatment process. The results compiled in Table VI exhibit the profound effects of the process in decreasing the TCLP lead in a wide range of lead-toxic soils and solid wastes containing total lead as high as 39, 680 mg/kg and TCLP lead as high as 542 mg/l. In each of the five cases, the instant process immobilizes the leachable lead to levels below the regulatory threshold of 5 mg/l set by the TCLP Test criteria for lead currently in force under the land ban regulations of the United States Environmental Protection Agency.

TABLE VI
Typical changes in solid waste characteristics due to process effects

| SOLID WASTE CHARACTERISTICS | MEASURED VALUES | |
|---|---|---|
| | Before Treatment | After Treatment & Curing |
| I. Lead-toxic SW-A | | |
| Total lead, % | 1.442 | 1.314 |
| TCLP-Lead, mg/l | 542.0 | 2.0 |
| Moisture, % | 23.0 | 33.0 |
| pH, S.U. | 8.1 | 4.8 |
| II. Lead-toxic SW-B | | |
| Total lead, % | 0.847 | 0.838 |
| TCLP-Lead, mg/l | 192.0 | 2.4 |
| Moisture, % | 27 | 36 |
| pH, S. U. | 8.0 | 5.3 |
| III. Lead-Toxic SW-C | | |
| Total Lead, % | 3.968 | 3.066 |
| TCLP-Lead, mg/l | 257.6 | 1.0 |
| Moisture, % | 10.0 | 18.1 |
| pH, S. U. | 7.2 | 4.5 |
| IV. Lead-Toxic SW-D | | |
| Total Lead, % | 2.862 | 2.862 |
| TCLP-Lead, mg/l | 245.3 | 0.38 |
| Moisture, % | 71.6 | 84.1 |
| pH, S. U. | 8.1 | 6.3 |
| V. Lead-Toxic Soil SW-E | | |
| Total Lead, % | 0.16 | 0.12 |
| TCLP-Lead, mg/l | 7.5 | 1.87 |
| Moisture, % | 12.3 | 23.0 |
| pH, S.U. | 7.0 | 5.4 |

It is obvious from Table VI that the instant process operates over a wide range of moisture and pH conditions. It is associated with 8 to 11% rise in moisture content. The end product of the treatment process may contain moisture in a typical range of 18% to 36% on a dry weight basis. The end product passes the Paint Filter Test for solids and there are no other byproducts or side streams generated during the process. The treated solid waste is cured in 4 to 5 hours and may be allowed to dry for 2 to 3 days after treatment for loss of unwanted moisture prior to final internment and disposition. This time is sufficient for the TCLP Tests to be completed as part of the disposal analysis under land ban regulations enforced by the USEPA.

It is necessary to establish the quantities of gypsum and phosphate reagent on a case-by-case basis, because the consumption of these materials will depend not only upon the initial lead level in the waste or soil, but also upon other waste characteristics such as cation exchange capacity, total buffering capacity, and the amounts of carbonates and bicarbonates present, among others. Bench scale treatability studies for each solid waste considered will be necessary to determine the optimum levels of material that are employed. The treatability studies are designed to optimize the amount and grade of gypsum powder (or other sulfate compound) needed during step I, and the amount and concentration of phosphoric acid (or other phosphate compound) needed in step II for cost-effective operation of the treatment system. Those skilled in the art are knowledgeable of such bench studies, which are usually carried out as precursors to full scale treatment.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A treatment process for treating lead-toxic solid wastes to stabilize leachable lead contained therein, said process comprising the steps of:
   mixing a solid waste containing leachable lead with a sulfate compound having at least one sulfate ion for reacting with said leachable lead to produce a first mixture, said first mixture containing a substantially insoluble lead compound or mineral species; and
   mixing said first mixture with a phosphate reagent having at least one phosphate ion for reacting with leachable lead remaining said first mixture to produce a second mixture, said second mixture containing a substantially insoluble lead compound or mineral species;
   curing said second mixture for a period
   such that the material so treated is substantially solid in form at the end of curing, the material passes the paint filter test, TCLP lead levels are decreased below 5.0 mg/l, the volume of said solid waste is reduced as a result of treatment and curing, and no secondary waste streams are generated.

2. The treatment process of claim 1, wherein said sulfate compound is selected from the group consisting of calcium sulfate, gypsum, sulfuric acid and alum.

3. The treatment process of claim 1, wherein said sulfate compound is supplied in the form of a dry powder homogeneously mixed with the said solid waste.

4. The treatment process of claim 2, wherein said sulfate composite is supplied in the form of a dry powder homogeneously mixed with the said solid waste.

5. The treatment process of claim 1, wherein said sulfate compound is supplied in the form of a liquid homogeneously mixed with the said solid waste.

6. The treatment process of claim 2, wherein said sulfate compound is supplied in the form of a liquid homogeneously mixed with the said solid waste.

7. The treatment process of claim 1, wherein said phosphate reagent is selected from the group consisting of phosphoric acid, mono-, di- and tri-basic phosphates.

8. The treatment process of claim 1, wherein said phosphate reagent is supplied as an aqueous solution.

9. The treatment process of claim 1, wherein said phosphate reagent is supplied in the form of a solid from the group consisting of mono-, di- and tribasic phosphates.

10. The treatment process of claim 1, wherein the leachable lead is converted to superhard phosphates and phosphate-sulfate mixed mineral crystals, calcium-substituted anglesites, anglesites, and pyromorphites.

11. The treatment process of claim 1, wherein the sulfate composition is employed in an amount of up to about 30 percent of the weight of waste material being treated.

12. The treatment process of claim 1, wherein the phosphate reagent is employed in an amount of up to about 30 percent of the weight of waste material being treated.

13. The treatment process of claim 1, wherein the solid waste is permitted to cure for 3–5 hours.

14. A treatment process according to claim 1, wherein said solid waste has a moisture content of from about 10 to about 40 percent by weight.

15. A treatment process according to claim 1, wherein said step of curing lasts for a period of 3 to 5 hours.

16. A treatment process for treating solid wastes to stabilize leachable lead contained therein, said process comprising the steps of:
   mixing a solid waste containing leachable lead with gypsum to produce a first mixture, said first mixture containing a substantially insoluble lead compound of mineral species; and
   mixing said first mixture with phosphoric acid for reacting with leachable lead remaining in said first mixture to produce a second mixture, said second mixture containing a substantially insoluble lead compound or mineral species;
   curing said second mixture for a period
   such that the material so treated is substantially solid in form at the end of curing, the material passes the paint filter test, TCLP lead levels are decreased below 5.0 mg/l, the volume of said solid waste is reduced as a result of treatment and curing, and no secondary waste streams are generated.

17. The treatment process of claim 16, wherein the gypsum is employed in an amount of up to about 30 percent of the weight of waste material being treated.

18. The treatment process of claim 16, wherein the phosphoric acid is employed in an amount of up to about 30 percent of the weight of waste material being treated.

19. A treatment process according to claim 16, wherein said solid waste has a moisture content of from about 10 to about 40 percent by weight.

20. A treatment process according to claim 16, wherein said step of curing lasts for a period of 3 to 5 hours.

* * * * *

REEXAMINATION CERTIFICATE (2819th)

United States Patent [19]
Pal et al.

[11] B1 5,193,936

[45] Certificate Issued Mar. 19, 1996

[54] FIXATION AND STABILIZATION OF LEAD IN CONTAMINATED SOIL AND SOLID WASTE

[75] Inventors: Dhiraj Pal, Chicago Heights; Karl Yost, Crete, both of Ill.

[73] Assignee: MAECORP Incorporated, Chicago, Ill.

Reexamination Request:
No. 90/003,305, Jan. 13, 1994

Reexamination Certificate for:
| | |
|---|---|
| Patent No.: | 5,193,936 |
| Issued: | Mar. 16, 1993 |
| Appl. No.: | 721,935 |
| Filed: | Jul. 23, 1991 |

Related U.S. Application Data

[63] Continuation-in-part of Ser. No. 494,774, Mar. 16, 1990, abandoned.

[51] Int. Cl.⁶ .................. B09B 3/00; E02D 3/00
[52] U.S. Cl. .................. 405/128; 210/751; 405/263; 588/256
[58] Field of Search .................. 405/128, 129, 405/263, 266; 106/900; 210/751, 912, 747; 588/256

[56] References Cited

U.S. PATENT DOCUMENTS

| | | | |
|---|---|---|---|
| 4,373,356 | 4/1988 | O'Hara et al. | 423/659 |
| 4,804,147 | 2/1989 | Hooper | 241/24 |
| 5,040,920 | 8/1991 | Forrester | 405/128 |
| 5,162,600 | 11/1992 | Cody et al. | 588/236 |

*Primary Examiner*—David H. Corbin

[57] ABSTRACT

A two-step treatment process is disclosed for application of lead-toxic wastes to fixate and stabilize leachable lead contained therein. The process employs the use of a sulfate compound, such as gypsum, in a first step; and a phosphate reagent, such as phosphoric acid, in a second step. After thorough mixing and curing, a substantially solid end product is formed in which the lead is chemically fixed and remains in stabilized form for indefinite geologic periods. The process reduces Toxicity Characteristic Leaching Procedure lead levels below the regulatory threshold of 5 mg/l as required by the U.S. Environmental Protection Agency. The waste also beneficially undergoes volume reduction in a short curing time, and is applicable in a variety of situations.

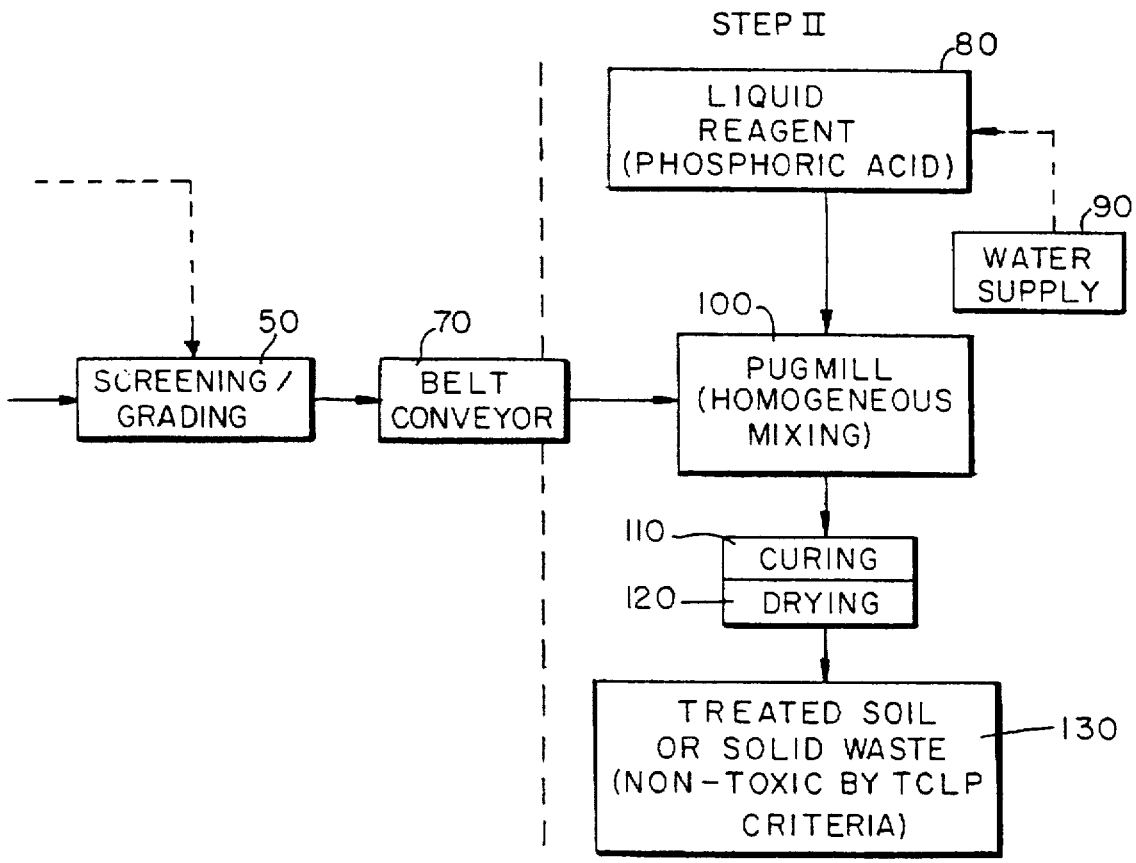

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5 and 6 is confirmed.

Claims 1–4, 7–20 are cancelled.

* * * * *